United States Patent
He et al.

(10) Patent No.: US 9,894,431 B2
(45) Date of Patent: Feb. 13, 2018

(54) MICROPHONE RUBBER BOOT

(71) Applicant: Cisco Technology, Inc., San Jose, CA (US)

(72) Inventors: James ZiYan He, Shanghai (CN); Jian Zou, Shanghai (CN); Yung Hua Su, Taipei (TW)

(73) Assignee: CISCO TECHNOLOGY, INC., San Jose, CA (US)

( * ) Notice: Subject to any disclaimer, the term of this patent is extended or adjusted under 35 U.S.C. 154(b) by 151 days.

(21) Appl. No.: 14/322,693

(22) Filed: Jul. 2, 2014

(65) Prior Publication Data
US 2016/0007106 A1 Jan. 7, 2016

(30) Foreign Application Priority Data
Jul. 1, 2014 (CN) .............................. 1125807480.2

(51) Int. Cl.
| | |
|---|---|
| *H04R 1/20* | (2006.01) |
| *H04R 1/02* | (2006.01) |
| *H04R 1/28* | (2006.01) |
| *H04R 1/08* | (2006.01) |
| *H04R 1/22* | (2006.01) |
| *H04M 1/03* | (2006.01) |

(52) U.S. Cl.
CPC .......... *H04R 1/2853* (2013.01); *H04R 1/028* (2013.01); *H04R 1/083* (2013.01); *H04R 1/222* (2013.01); *H04M 1/035* (2013.01); *H04R 2201/025* (2013.01); *H04R 2201/029* (2013.01); *H04R 2410/07* (2013.01); *H04R 2499/11* (2013.01)

(58) Field of Classification Search
CPC .. H04R 1/028; H04R 1/083; H04R 2201/025; H04R 1/222; H04R 2410/07; H04R 2499/11; H04R 1/2853; H04R 2201/029; H04M 1/035
USPC .................................................. 381/338, 388
See application file for complete search history.

(56) References Cited

U.S. PATENT DOCUMENTS

| | | | | |
|---|---|---|---|---|
| 6,561,823 | B1 * | 5/2003 | Konno ..................... | H04M 1/03 439/86 |
| 8,509,459 | B1 * | 8/2013 | Isvan ....................... | H04R 3/06 381/111 |
| 2009/0245565 | A1 * | 10/2009 | Mittleman ............ | H04M 1/035 381/365 |
| 2015/0271610 | A1 * | 9/2015 | Vandyke ................ | H04R 25/60 381/322 |

* cited by examiner

*Primary Examiner* — Sean H Nguyen
(74) *Attorney, Agent, or Firm* — Polsinelli PC

(57) ABSTRACT

A multi-sided microphone boot having a front side, a back side, a first lateral side, a second lateral side, and a bottom side. The front side can have a sound tube extending from at least an internal microphone receiving compartment to an external surface of the front side. The back side can form a microphone opening extending from the internal microphone receiving compartment to at least an external surface of the back side. The first lateral side can include at least one protrusion extending from an external surface of the first lateral side. The second lateral side can include at least one protrusion extending from an external surface of the second lateral side. The protrusions can assist in reducing the contact area and/or the number of contacts between the microphone boot and a microphone receiving compartment within a telecommunication device.

18 Claims, 10 Drawing Sheets

MICROPHONE RUBBER BOOT

CROSS REFERENCE TO RELATED APPLICATIONS

This Application claims priority to Chinese patent application Serial Number 1125807480.2, filed on Jul. 1, 2014, the content of which is incorporated herein by reference in its entirety.

TECHNICAL FIELD

The present technology pertains to a microphone boot, and more specifically pertains using a microphone rubber boot that reduces non-linear coupling from a housing of a telecommunication device to a microphone residing in the microphone rubber boot.

BACKGROUND

Current telecommunication devices include a microphone for picking up sounds for outgoing transmissions and a speaker for playing received transmissions. Typically, the microphone and speaker are mounted in the telecommunication device and are separated. Ideally, the microphone and speaker are separated as much as possible however, the distance of separation is constrained because the microphone needs to be positioned near a user's mouth and the speaker needs to be positioned near the user's ear in accordance with the industrial design of the telecommunication device. When the speaker plays a received transmission, the microphone can pick up the played transmission which can result in an echo especially during double talk situation. Typically, the best ways to reduce such conditions also reduce the quality of the played transmission.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Disclosed are microphone boots having protrusions to assist in reducing non-linear coupling from a housing of a telecommunication device to a microphone residing in the microphone boot. The microphone boots can have a sound tube that extends from a front side of the microphone boot to an internal microphone receiving compartment. The sound tube can direct sound via an opening at a distal end to a microphone residing in the internal microphone receiving compartment. Each lateral side of the microphone boot can include one or more protrusions. In some embodiments, the protrusions can be dome or bulgy shaped. In such embodiments, one or more sides of the microphone boot can include one or more protrusions on an external surface of the side. In such embodiments, the protrusions can serve as the points of contacts between the microphone boot and a microphone boot receiving compartment within a telecommunication device when the microphone boot is inserted in the microphone boot receiving compartment. In some embodiments, the protrusions on each lateral side can be mating protrusions. Each mating protrusion can mate, engage and/or couple with a corresponding mating protrusion receiver in a microphone boot receiving compartment within a telecommunication device. In such embodiments, the mating protrusions can serve as the points of contacts between the microphone boot and a microphone boot receiving compartment within a telecommunication device when the microphone boot is inserted in the microphone boot receiving compartment.

The disclosed technology addresses the need in the art for a microphone boot that reduces the amount of vibration that is picked up by a microphone residing in the microphone boot 100. More specifically, by limiting the amount of contact area and/or contact points between a microphone boot and a microphone receiving compartment, the amount of vibration that is picked up by the microphone is reduced. In addition, the microphone boot can be made of rubber to further assist in reducing the amount of vibration that is picked up by the microphone.

As used herein the term "adapted" shall be considered to interchangeably be used to refer to adapted and adaptable, unless the term "adaptable" is explicitly used to distinguish from "adapted." The proper understanding of the term will be apparent to persons of ordinary skill in the art in the context in which the term is used.

Figure 1A:
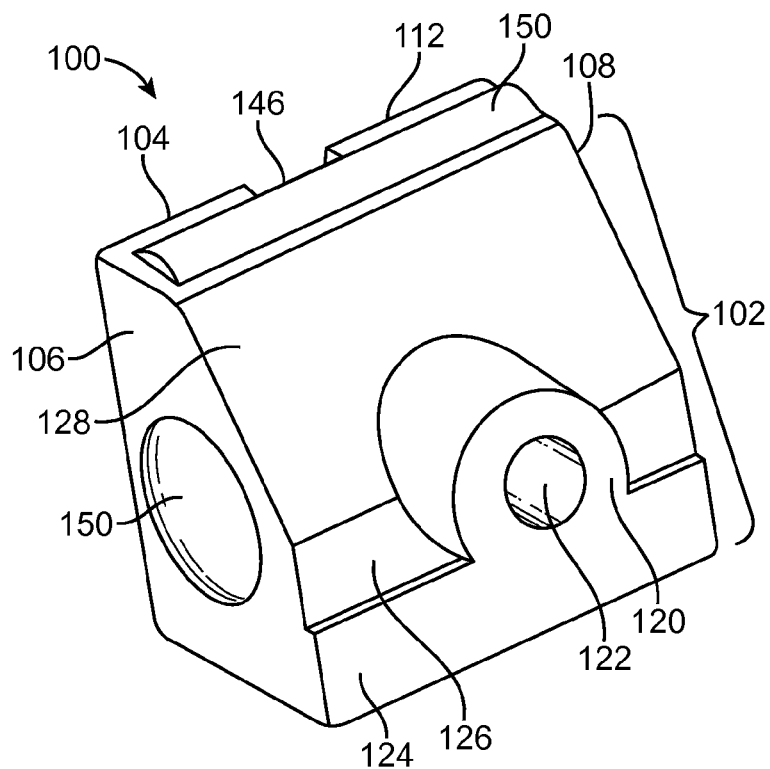
FIG. 1A illustrates a front perspective view of a microphone boot in accordance with an exemplary embodiment.
Figure 1B:
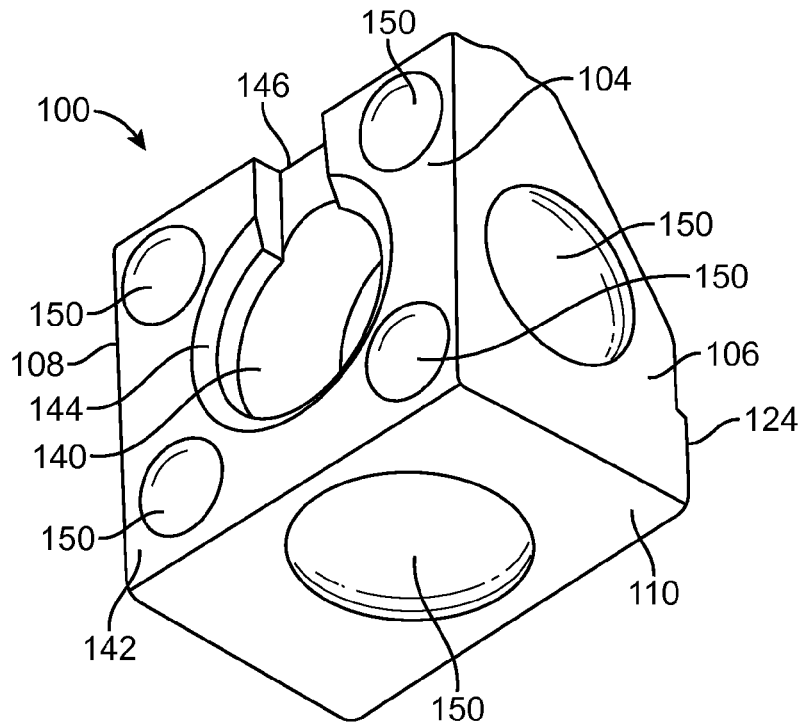
FIG. 1B illustrates a rear perspective view of a microphone boot in accordance with an exemplary embodiment.

Referring to FIGS. 1A and 1B, front and back perspective views of a microphone boot in accordance with an exemplary embodiment are illustrated. As shown, the microphone boot 100 can include a front side 102, a back side 104, a first lateral side 106, a second lateral side 108, a bottom side 110 and a top side 112. In some embodiments, the microphone boot 100 can be made of rubber. The front side 102 can include a sound tube 120. The sound tube 120 can have a first distal end at about the front side 102 and a second distal end, opposite the first distal end, at about an internal microphone receiving compartment (not shown). The sound tube 120 can assist in receiving and directing sound to an internal microphone receiving compartment. More specifically, the sound tube 120 can form a sound tube opening 122 that receives the sound and the walls that form the sound tube 120 can assist in directing the sound to the internal microphone receiving compartment. The sound tube 120 can be, but is not limited to, a cylindrical shape. As shown in FIG. 1A, the first distal end of the sound tube 120 can be substantially flush with an outermost external surface 124 of the front side 102. In some embodiments, the sound tube 120 can extend beyond the outermost external surface 124 of the front side 102.

Figure 1C:
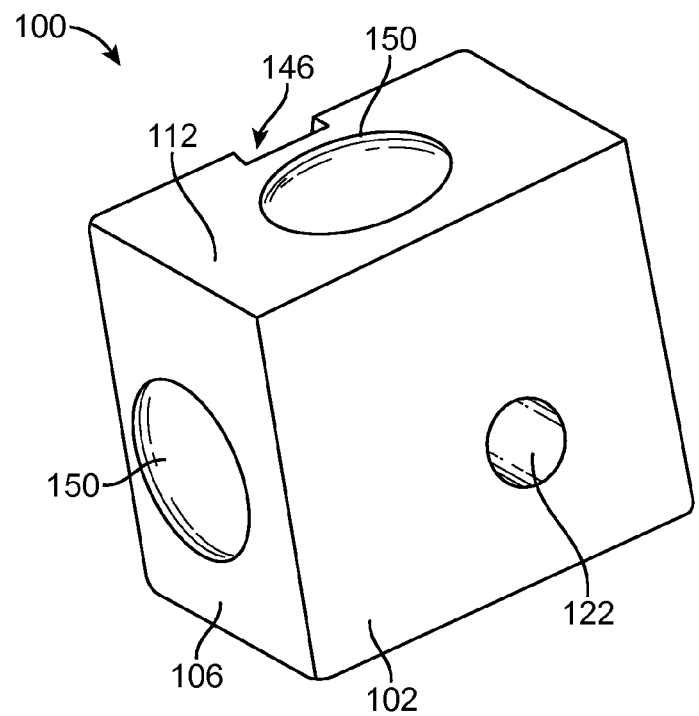
FIG. 1C illustrates a front perspective view of a microphone boot having a single front side in accordance with an exemplary embodiment.
Figure 1D:
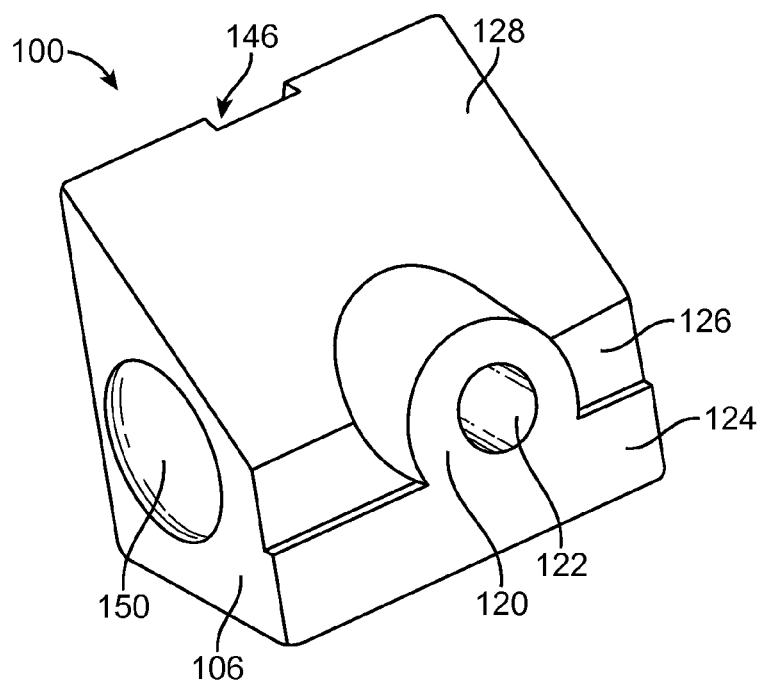
FIG. 1D illustrates a front perspective view of a microphone boot having five sides in accordance with an exemplary embodiment.

As shown in FIG. 1A, the front side 102 of the microphone boot 100 can have multiple exterior surfaces. For example, the front side 102 can include an outermost external surface 124, an external surface 126 and an angled external surface 128. The outermost external surface 124 can be at the bottom of the front side 102. The outermost external surface 124 can be limited in size to limit the amount of contact between the front side 102 of the microphone boot 100 and a microphone boot receiving compartment (discussed in more detail below). The external surface 126 can be between the outermost external surface 124 and the angled external surface 128. As shown, the vertical dimension of the external surface 126 can be approximately equal, but not limited to, the diameter of the sound tube opening 122. The angled exterior surface 128 can start, at about the top of the external surface 126 and can end at about an edge of the top side 112. In such embodiments, due to the smaller size of the top side 112 compared to the bottom side 110, a protrusion 150 on the top side 112 can be beam shaped as shown in FIG. 1A. In some embodiments, the front side 102 can be a single surface as shown in FIG. 1C. In some embodiments, by varying the angle of the angled external surface 128, the resulting microphone boot 100 can have no top side as shown in FIG. 1D.

Returning to FIGS. 1A and 1B, the back side 104 of the microphone boot 100 can form a microphone opening 140 which can extend from at least an external surface 142 of the back side 104 to the internal microphone receiving compartment. The microphone opening 140 can be sized to allow a microphone (not shown) to be inserted in the internal microphone receiving compartment. Typically, the microphone opening 140 can be sized smaller than the microphone to be inserted and thus assists in retaining the microphone within the internal microphone receiving compartment. The internal microphone receiving compartment can be shaped to receive and retain an inserted microphone. In some embodiments, the microphone can be retained within the internal microphone receiving compartment using known retention mechanisms and/or methodologies. In some embodiments, the back side 104 forming the microphone opening 140 can include a beveled edge 144 at about the microphone opening 140. The back side 104 can include at least one wire channel 146 adapted to allow one or more microphone wires to reside in the wire channel 146 Each wire channel 146 can extend from the microphone opening 140 to an edge of the back side 104.

In some embodiments, one or more sides can include one or more protrusions. The one or more protrusions can be a point of contact between the microphone boot 100 and a microphone boot receiving compartment (discussed in more detail below). The one or more protrusions can vary in shape and size. The size of each protrusion can be in accordance with the amount of space on a given side and the size of the corresponding point of contact in the microphone boot receiving compartment. As shown in FIGS. 1A and 1B, the back side 104 can include four protrusions 150, the first lateral side 106, second lateral side 108 and bottom side 110 can each include a single protrusion 150 and the top side 112 can include a single protrusion 150. As shown the protrusions 150 on the first lateral side 106, second lateral side 108 and bottom side 110 are approximately equal in size and are dome shaped or bulgy shaped. As shown in FIG. 1B, the four protrusions 150 on the back side 104 can be smaller than the protrusions 150 on the first lateral side 106, second lateral side 108 and bottom side 110 due to the microphone opening 140. Each of the protrusions 150 on the back side 104 can be positioned in a corner. The single protrusion 150 on the top side 112 can be bar shaped. The front side 102 can include a protrusion. For example, as shown in FIGS. 1A, 1B and 1D, the outermost external surface 124 on the front side 102 can be a protrusion.

In other embodiments, the size, shape and locations of the protrusions can vary from the protrusions 150 shown in FIGS. 1A-1D. For example, the protrusion 150 on the top side 112 can be replaced with one or more of the smaller protrusions, such as the protrusions on the bottom side 110. In another example, the protrusion 124 on the front side 102 can be replaced with one or more protrusions, such as the bar shaped protrusion 150 on the top side 112 or one or more of the smaller protrusions 150 on the back side 104.

Figure 2A:
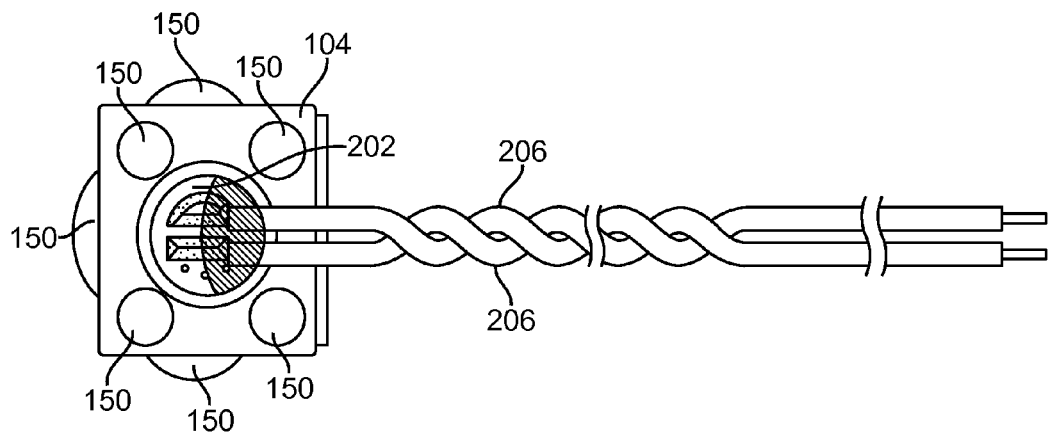
FIG. 2A illustrates a rear view of the microphone boot shown in FIG. 1 in accordance with an exemplary embodiment.
Figure 2B:
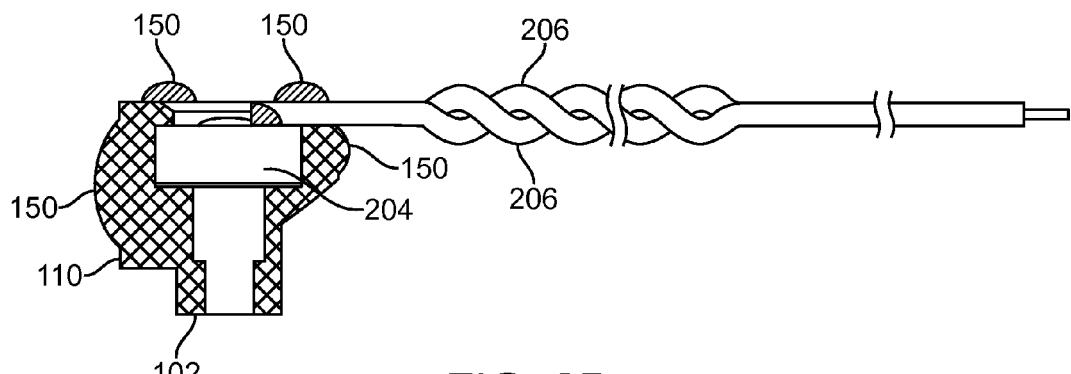
FIG. 2B illustrates a side exploded view of the microphone boot shown in FIG. 1 in accordance with an exemplary embodiment.
Figure 2C:
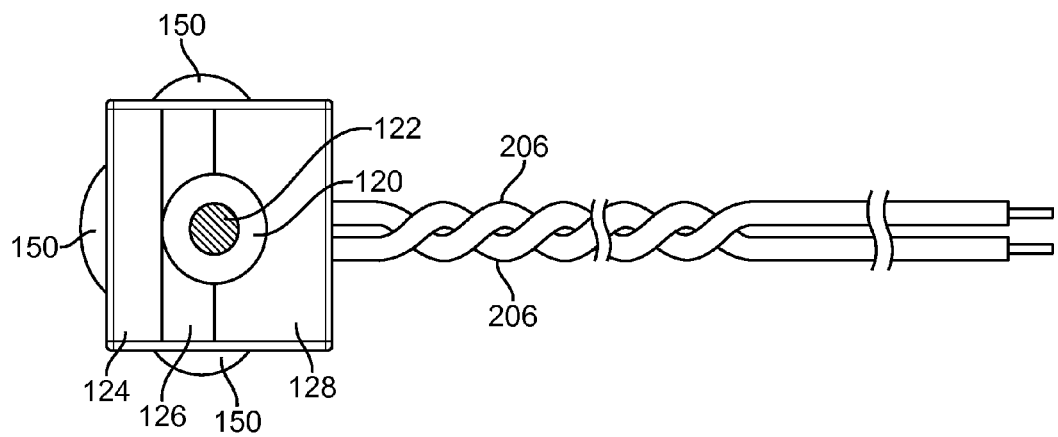
FIG. 2C illustrates a top view of the microphone boot shown in FIG. 1 in accordance with an exemplary embodiment.

Referring to FIGS. 2A, 2B and 2C, a bottom view, a side exploded view and a front view of the microphone boot shown in FIGS. 1A and 1B, are illustrated. As shown in FIG. 2A, a microphone 202 can be inserted in the microphone boot 100. As shown in FIG. 2B, the microphone 202 can be inserted in an internal microphone receiving compartment 204. The microphone 202 can be inserted so that a front side of the microphone 202 faces the sound tube opening 122 on the front side 102 of the microphone boot 100 and a back side of the microphone 202 faces the microphone opening 140 on the back side 104 of the microphone boot 100. The microphone 202 can include one or more wires 206 that can extend from the back side of the microphone 200. The one or more wires 206 can partially or fully reside in the wire channel 146 on the back side 104. The wire channel 146 can be sized to allow the microphone boot 100 to be placed on a surface without the one or more wires 206 interfering with the orientation of the microphone boot 100. In some embodiments, the wire channel 146 can be sized along with the one or more protrusions 150 to allow the microphone boot 100 to be placed on a surface without the one or more wires 206 interfering with the orientation of the microphone boot 100.

Figure 3:
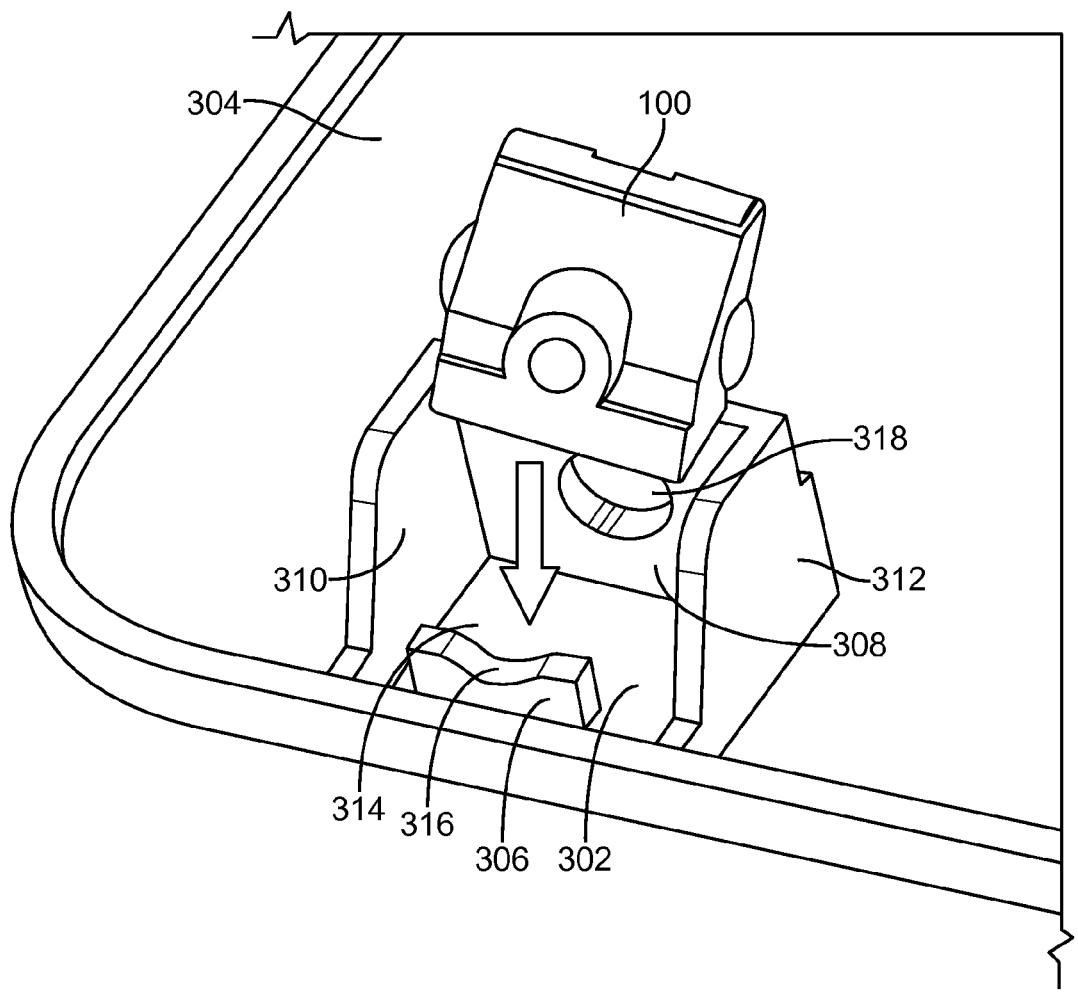
FIG. 3 illustrates a perspective view of the microphone boot shown in FIG. 1 being inserted into a microphone boot receiving compartment in accordance with an exemplary embodiment.

Referring to FIG. 3, a partial view of a microphone boot of FIG. 1 being installed in a microphone receiving compartment in accordance with an exemplary embodiment is illustrated. As shown, the microphone boot 100 can be installed into a microphone receiving compartment 302 of a telecommunication device 304. The telecommunication device 304 can be, but is not limited to, a mobile phone, smart phone, tablet, tape recorder, a laptop or any other telecommunication device that uses a microphone. In some embodiments, the microphone receiving compartment 302 can comprise four walls. In other embodiments, the microphone receiving compartment 302 can comprise more or less than four walls. As shown, the microphone receiving compartment 302 comprises a front wall 306, a back wall 308, a first side wall 310, a second side wall 312 and a bottom 314. The front wall 306 can be shaped to assist in preventing interference with the sound tube opening 122. For example, as shown, the front wall 306 can include a curve 316 to avoid the front wall 306 interfering with the sound tube opening 122. The back wall 308 can be shaped to provide a back wall opening 318. The back wall opening 318 can be formed to assist in allowing heat from a microphone within the microphone boot 100 to dissipate.

Figure 4:
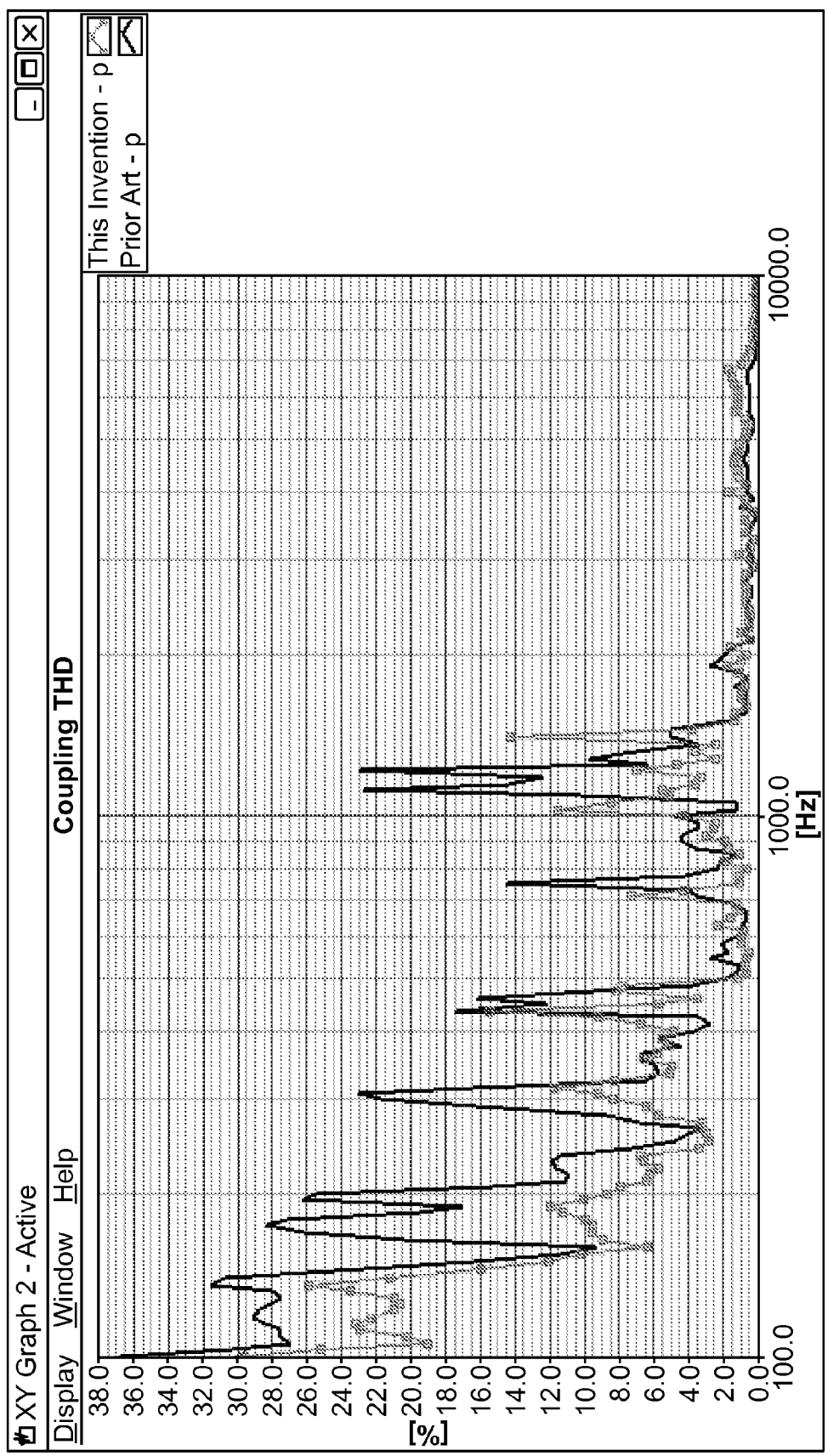
FIG. 4 illustrates a screenshot of a graph of the coupling total harmonic distortion (THD) of a prior art microphone boot and a microphone boot shown in FIG. 1 in accordance with an exemplary embodiment.

The microphone boot 100 can be sized to fit into the microphone receiving compartment 302 with one or more of the protrusions 150 of the microphone boot 100 being the only points of contact with one or more walls 306, 308, 310, 312 of the microphone receiving compartment 302. Preferably, the contact between two or more of the protrusions 150 of the microphone boot 100 and two or more walls 306, 308, 310, 312 can maintain the microphone boot 100 within the microphone receiving compartment 302 and also allow the microphone boot 100 to be removed when a sufficient pulling force is applied to the microphone boot 100. By limiting the contact area between the microphone boot 100 and the microphone receiving compartment 302, the amount of vibration that is picked up by a microphone 202 in the microphone boot 100 can be reduced. For example, a screenshot of a graph of the coupling total harmonic distortion (THD) of a prior art microphone boot and a microphone boot 100 shown in FIGS. 1A and 1B is illustrated in FIG. 4. As shown, the THD of microphone boot 100 shown in FIGS. 1A and 1B is significantly lower than the THD of the prior art microphone boot.

Figure 5:
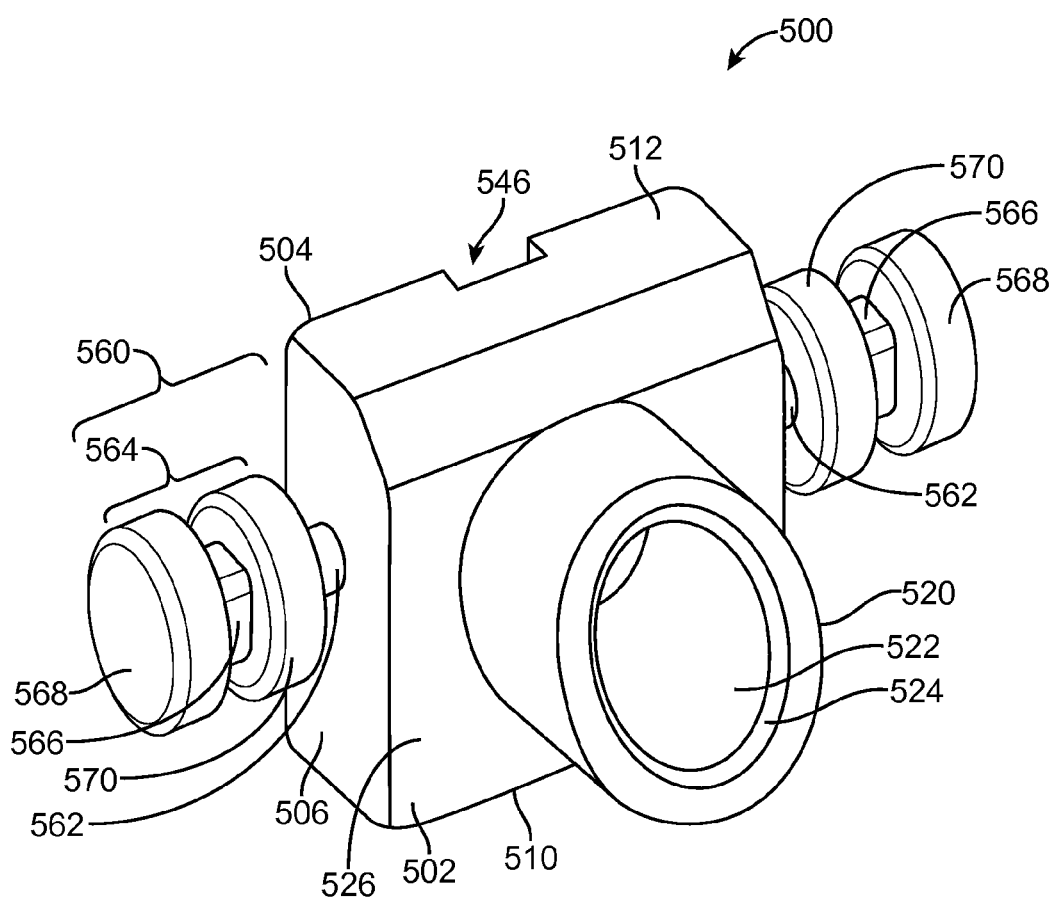
FIG. 5 illustrates a front perspective view of a microphone boot having mating protrusions in accordance with an exemplary embodiment.

Referring to FIG. 5, a front perspective view of a microphone boot in accordance with another exemplary embodiment is illustrated. As shown, the microphone boot 500 can include a front side 502, a back side 504, a first lateral side 506, a second lateral side 508, a bottom side 510 and a top side 512. In some embodiments, the microphone boot 500 can be made of rubber. The front side 502 can include a sound tube 520. The sound tube 520 can have a first distal end at about the front side 502 and a second distal end, opposite the first distal end, at about an internal microphone receiving compartment (not shown). The sound tube 520 shown in FIG. 5 can be substantially similar to the sound tube shown in FIG. 1A. As such, the sound tube 520 can assist in receiving and directing sound to an internal microphone receiving compartment. More specifically, the sound tube 520 can form a sound tube opening 522 that receives the sound and the walls that form the sound tube 520 can assist in directing the sound to the internal microphone receiving compartment. The sound tube 520 can be, but is not limited to, a cylindrical shape. As shown, the first distal end of the sound tube 520 can extend beyond an external surface 526 of the first side 502. As shown, the first distal end of the sound tube 520 can be angled. The first distal end of the sound tube 520 can include a beveled edge 524. In some embodiments, the first distal end of the sound tube 520 can be flush with the external surface 526 of the front side 502. As shown, the front side 502 of the microphone boot 500 can have multiple exterior surfaces. For example, the front side 102 can include an external surface 526 and an angled external surface 528. The angled external surface 528 can start, at about the top of the sound tube 508 and can end at about an edge of the top side 112.

Figure 6A:
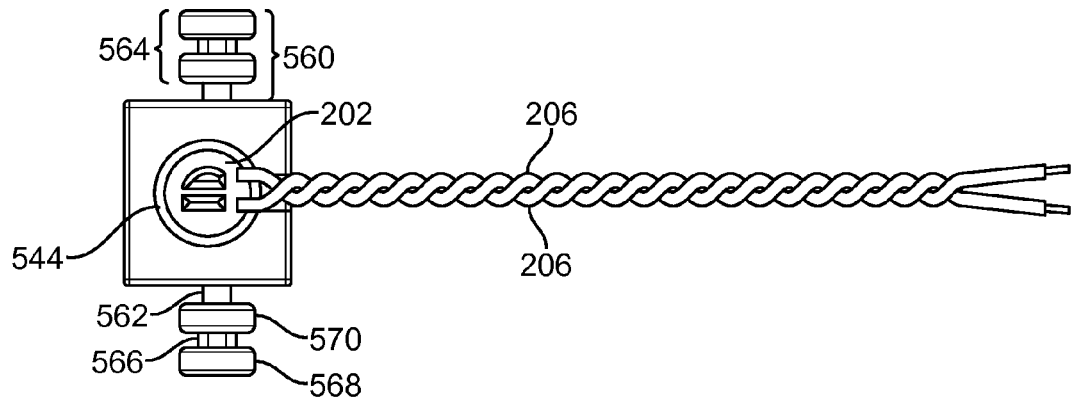
FIG. 6A illustrates a rear view of the microphone boot shown in FIG. 5 in accordance with an exemplary embodiment.
Figure 6B:
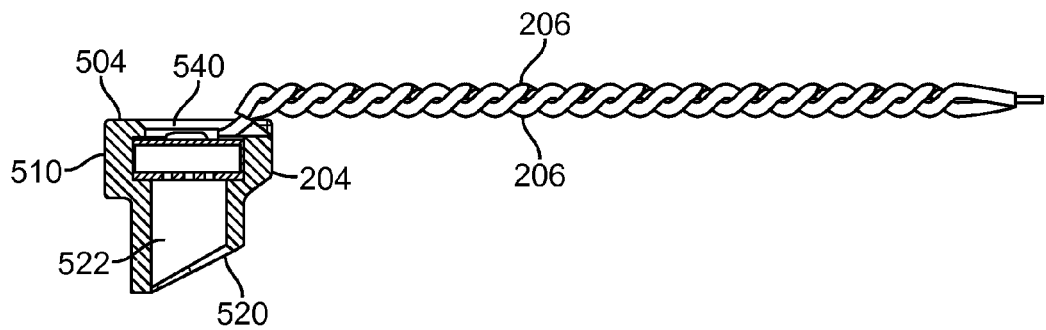
FIG. 6B illustrates a side exploded view of the microphone boot shown in FIG. 5 in accordance with an exemplary embodiment.
Figure 6C:
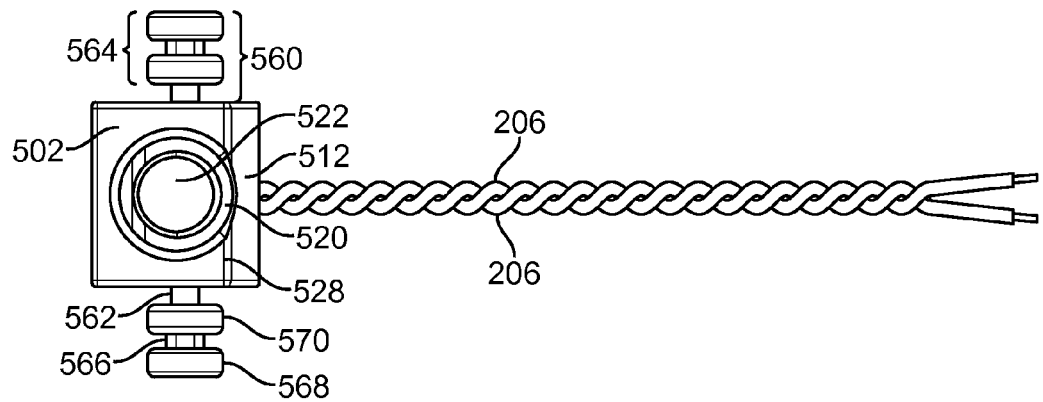
FIG. 6C illustrates a top view of the microphone boot shown in FIG. 5 in accordance with an exemplary embodiment.

Referring to FIGS. 6A-6C, a bottom view, a side exploded view and a front view of the microphone boot shown in FIG. 5, are illustrated. As shown in FIG. 6A, a microphone 202 can be inserted in the microphone boot 500. As shown in FIG. 6B, the microphone 202 can be inserted in an internal microphone receiving compartment 204. The microphone 202 can be inserted so that a front side of the microphone 202 faces the sound tube opening 522 on the front side 502 of the microphone boot 500 and a back side of the microphone 202 faces a microphone opening 540 on the back side 504 of the microphone boot 500. The back side 504 of the microphone boot 500 can form the microphone opening 540 which can extend from at least an external surface of the back side 504 to the internal microphone receiving compartment. The microphone opening can be sized to allow a microphone 202 to be inserted in the internal microphone receiving compartment. Typically, the microphone opening 540 can be sized smaller than the microphone to be inserted and thus assists in retaining the microphone within the internal microphone receiving compartment. The internal microphone receiving compartment can be shaped to receive and retain an inserted microphone. In some embodiments, the microphone can be retained within the internal microphone receiving compartment using known retention mechanisms and/or methodologies. In some embodiments, the back side 504 forming the microphone opening 540 can include a beveled edge 544 at about the microphone opening. The microphone 202 can include one or more wires 206 that can extend from the back side of the microphone 202.

Figure 7:
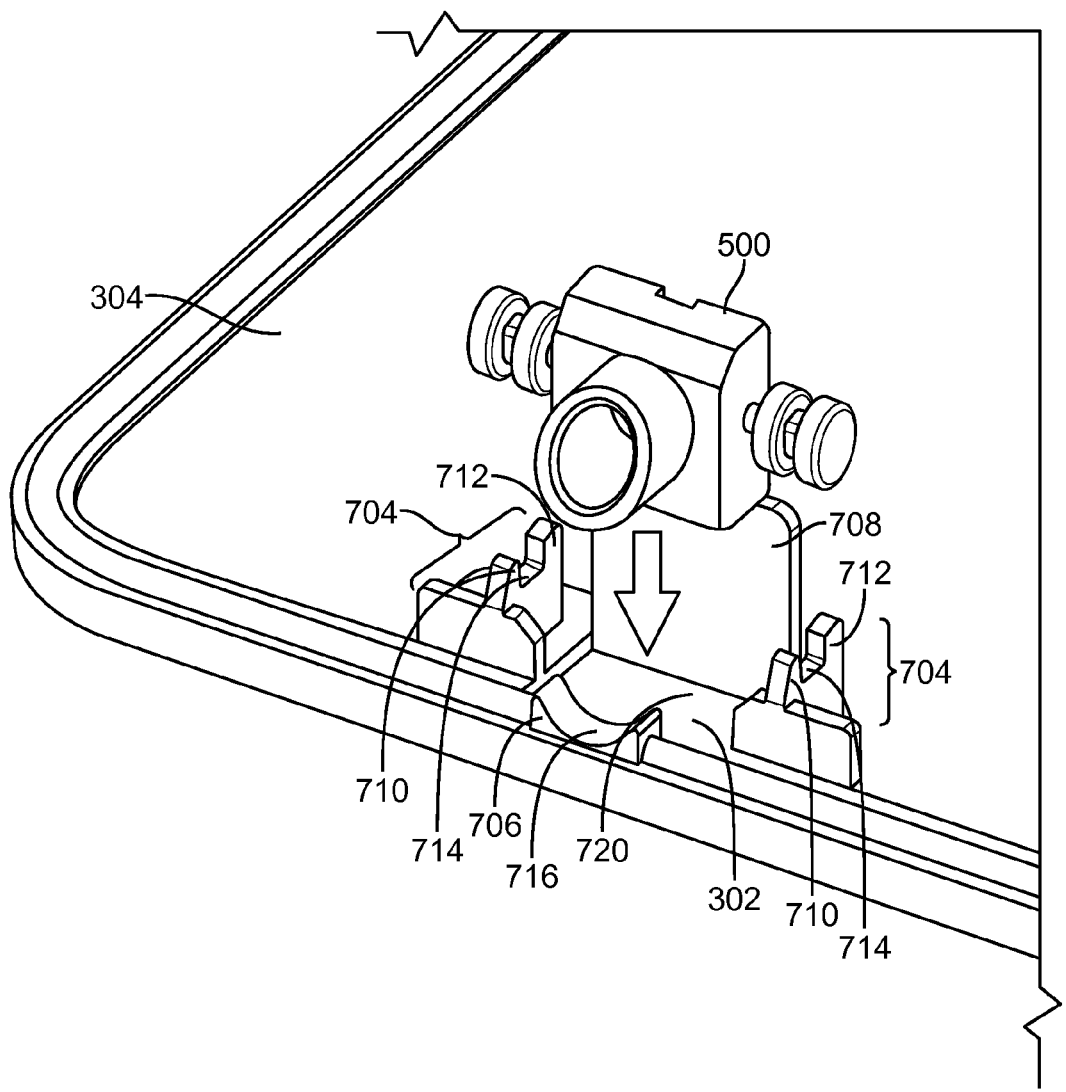
FIG. 7 illustrates a perspective view of the microphone boot shown in FIG. 5 being inserted into a microphone boot receiving compartment in accordance with an exemplary embodiment.

Returning to FIG. 5, the first lateral side 506 and second lateral side 508 of the microphone boot 500 can each include a mating protrusion 560 that extends from an external surface of the lateral side 506, 508. Each of the mating protrusions 560 can be adapted to mate, engage or couple with a mating protrusion receiver in a microphone boot receiving compartment. For example, as shown, each mating protrusion 560 can include an extender 562 and an engagement portion 564. The extender 562 can extend the engagement portion away from the external surface of the lateral sides 506, 508. The engagement portion 564 can include a center portion 566 interposed between an outer member 568 and an inner member 570. The center portion 566 can be adapted to engage with a corresponding mating protrusion receiver 704 of a microphone boot receiving compartment 302 as shown in FIG. 7. The center portion 566 can be, but not limited to, substantially square shaped. By using a substantially square shaped center portion 566, the straight sides of the center portion 566 can assist in preventing the microphone boot 500 from rotating within the mating protrusion receivers 704. The outer member 568 and inner member 570 can assist in limiting the lateral movement of the microphone boot 500 when engaged with the mating protrusion receivers 704. For example, the length of the center portion 566 between the outer member 568 and inner member 570 can be sized to limit the amount of lateral movement of the microphone boot 500 when engaged with the mating protrusion receivers 702.

Figure 8:
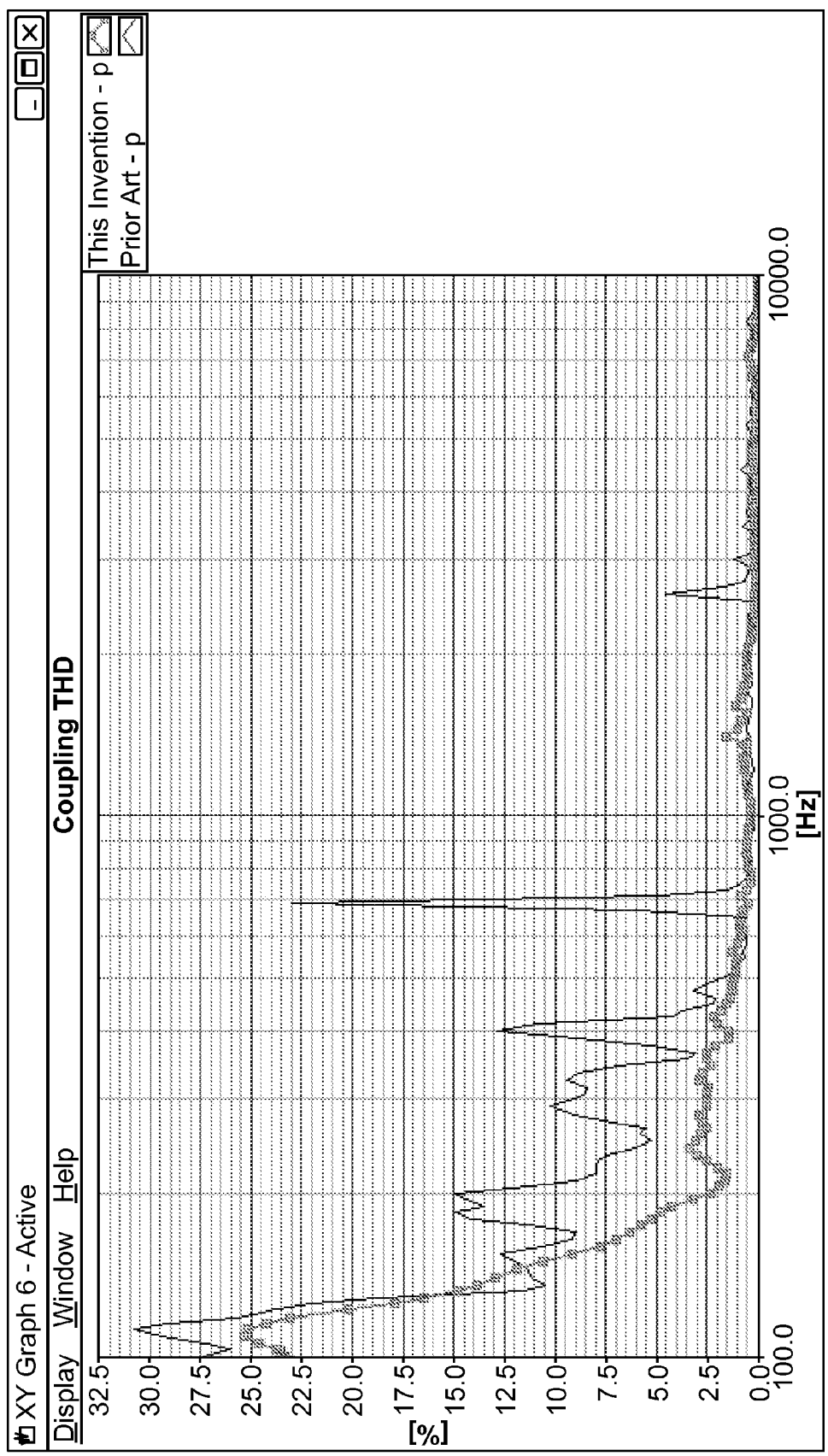
FIG. 8 illustrates a screenshot of a graph of the coupling total harmonic distortion (THD) of a prior art microphone boot and a microphone boot shown in FIG. 5 in accordance with an exemplary embodiment.

Referring to FIG. 7, a partial view of a microphone boot of FIG. 5 being installed in a microphone receiving compartment in accordance with an exemplary embodiment is illustrated. As shown, the microphone boot 500 can be installed into a microphone receiving compartment 302 of a telecommunication device 304. The microphone boot receiving compartment 302 can include mating protrusion receivers 704 on the lateral sides, a front wall 706, and a back wall 708. The front wall 706 can be shaped to assist in preventing interference with the sound tube opening 522. For example, as shown, the front wall 706 can include a curve 716 to avoid the front wall 706 interfering with the sound tube opening 522. Each of the mating protrusion receivers 704 can be adapted to receive, mate, engage or couple with the mating protrusions 560 of the microphone boot 500. Each mating protrusion receiver 704 can include a first post 706 and a second post 708 with a post channel 710 formed between the first post 706 and the second post 708. The post channel 710 can be adapted to receive the center portion 566 of a mating protrusion 560. The first post 706 and second post 708 can assist in limiting the lateral movement of the coupled microphone boot 500. The height of the mating protrusion receivers 704 can be sized to suspend a coupled microphone boot 500 above a bottom surface 720 of the microphone boot receiving compartment 302. In other embodiments, other types of mating couplers can be used. By suspending the microphone boot 500 in the microphone receiving compartment 302, the amount of vibration that is picked up by a microphone 202 in the microphone boot 500 can be reduced. For example, a screenshot of a graph of the coupling total harmonic distortion (THD) of a prior art microphone boot and a microphone boot shown 500 in FIG. 5 is illustrated in FIG. 8. As shown, the THD of microphone boot 500 shown in FIG. 5 is significantly lower than the THD of the prior art microphone boot.

To generate the screenshots shown in FIGS. 4 and 8, a telecommunication device containing a microphone to be tested was placed in an anechoic chamber to record the THD measurements. An output of a computer was connected to an amplifier which was connected to a speaker within the telecommunication device. The microphone being tested was connected to an input of the computer. The computer ran SoundCheck®, a software package by Listen Inc. of Boston, Mass. The software package captured the THD curves produced by the microphone being tested. In one test, a conventional microphone and the microphone as shown in FIGS. 1A and 1B were tested and produced the THD measurements shown in FIG. 4. In another test, a conventional microphone and the microphone as shown in FIG. 5 were tested and produced the THD measurements shown in FIG. 8.

Figure 9:
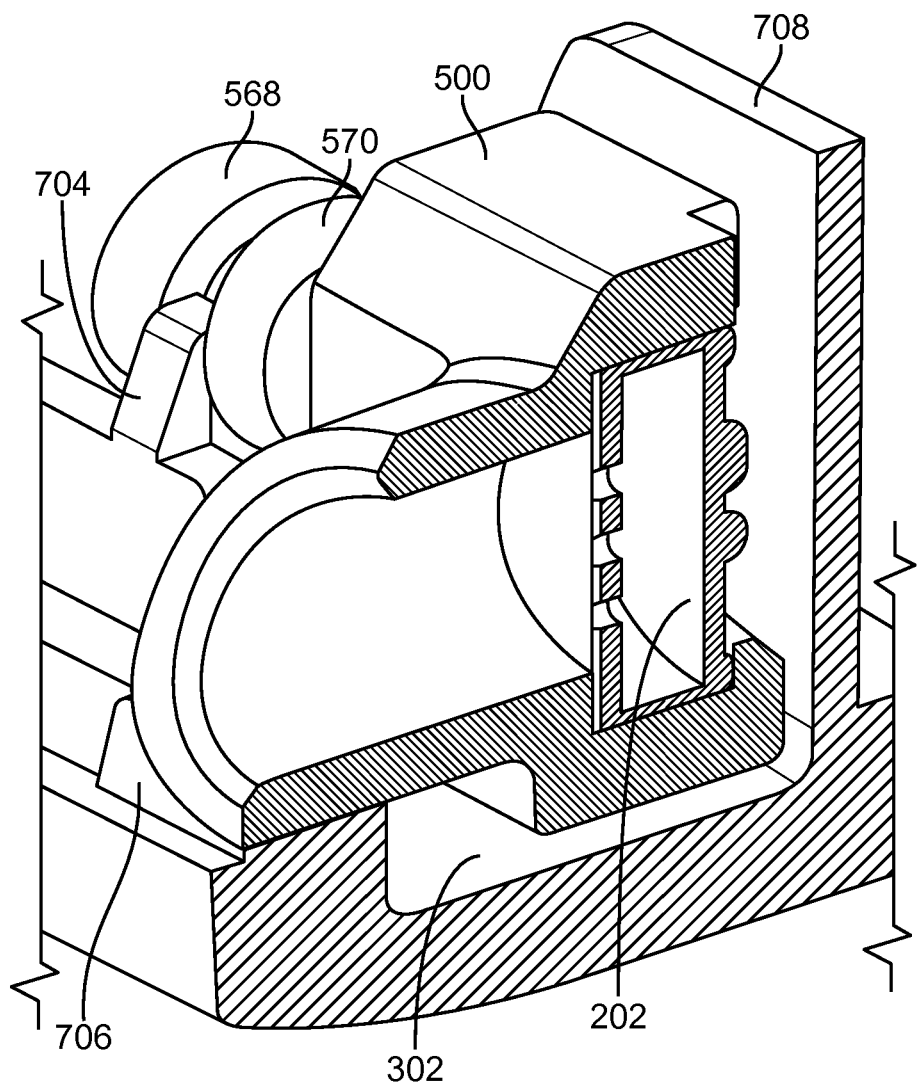
FIG. 9 illustrates a partial view of the microphone boot shown in FIG. 5 in accordance with an exemplary embodiment.

Referring to FIG. 9, a partial view of the microphone boot shown in FIG. 5 in accordance with an exemplary embodiment is illustrated. As shown, the microphone boot 500 can be coupled with a mating protrusion receiver 704 with the microphone boot 500 being suspended above the bottom surface 720 of the microphone boot receiving compartment 302. Although not shown in FIG. 9, the back wall 708 can include an opening to allow heat to dissipate from the microphone 202.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A microphone boot comprising:
   a front side having a sound tube extending from at least an internal microphone receiving compartment to an external surface of the front side;
   a back side opposite the front side, the back side forming a microphone opening extending from the internal microphone receiving compartment to at least an external surface of the back side;
   a first lateral side interposed between the front side and the back side;
   a second lateral side opposite the first lateral side, the second lateral side interposed between the front side and the back side;
   a first protrusion extending from an external surface of the first lateral side;
   a second protrusion extending from an external surface of the second lateral side, the second protrusion being distinct from the first protrusion and wherein the first protrusion and the second protrusion are distally tapered to limit contact area and/or points between the microphone boot and a receiving compartment; and
   at least one back protrusion located between the microphone opening and an edge of the back side.

2. The microphone boot of claim 1 wherein an end of the sound tube extends beyond the external surface of the front side.

3. The microphone boot of claim 1 wherein an end of the sound tube extends beyond the external surface of the front side and a distal end of said end of the sound tube is angled.

4. The microphone boot of claim 1 wherein the back side includes four distinct back protrusions.

5. The microphone boot of claim 1 wherein the back side includes at least one wire channel with each wire channel extending between the microphone opening and an edge of the back side.

6. The microphone boot of claim 1 further comprising a microphone residing in the internal microphone receiving compartment.

7. The microphone boot of claim 1 wherein the front side is angled starting at about a center of the sound tube and ending at about a top side with the top side being opposite the bottom side, the bottom side being interposed between the front side and back side and orthogonal to the front side, back side, first lateral side and second lateral side.

8. The microphone boot of claim 4, further comprising a bottom side interposed between the front side and back side and orthogonal to the front side, back side, first lateral side and second lateral side, wherein the bottom side further comprises a third protrusion extending from an external surface of the bottom side, the third protrusion being distinct from the first protrusion, the second protrusion, and the four distinct back protrusions.

9. The microphone boot of claim 1 wherein the front side is sloped starting at about a center of the sound tube and ending at about an edge of a second side.

10. The microphone boot of claim 1 further comprising:
   a bottom side interposed between the front side and back side and orthogonal to the front side, the back side, the first lateral side, and the second lateral side; and
   a top side opposite the bottom side and each of the bottom side and top side include at least one protrusion extending from an external surface of the bottom side and the top side.

11. The microphone boot of claim 1 wherein the microphone boot is rubber.

12. The microphone boot of claim 1 wherein the first protrusion is a first mating protrusion extending from the external surface of the first lateral side and the second protrusion is a second mating protrusion extending from the external surface of the second lateral side, and wherein both of the first mating protrusion and the second mating protrusion are adapted to mate with a corresponding mating protrusion receiver within a telecommunication device.

13. The microphone boot of claim 12 wherein each mating protrusion further comprises:
   an extender from the external surface of the corresponding lateral side;
   an inner member coupled with the extender;
   an outer member; and
   a center portion interposed between the inner member and outer member, the center portion adapted to mate with the corresponding mating protrusion receiver within the telecommunication device.

14. The microphone boot of claim 13 wherein the center portion is square shaped.

15. The microphone boot of claim 14 wherein the center portion, the inner member, and the outer member are sized to prevent lateral movement of the microphone boot when the microphone boot is mated with the corresponding mating protrusion receivers.

16. The microphone boot of claim 12 wherein the corresponding mating protrusion receivers are sized to suspend the microphone boot when mated.

17. The microphone boot of claim 12 wherein the end of the sound tube extends beyond the external surface of the front side.

18. The microphone boot of claim 12 further comprising a microphone residing in the internal microphone receiving compartment.

* * * * *